United States Patent
Audoin

(10) Patent No.: US 7,204,079 B2
(45) Date of Patent: Apr. 17, 2007

(54) DEVICE FOR DETERMINING THE MASS OF NOX STORED IN A NOX TRAP, AND A SYSTEM FOR SUPERVISING THE REGENERATION OF A NOX TRAP INCLUDING SUCH A DEVICE

(75) Inventor: Arnaud Audoin, Paris (FR)

(73) Assignee: Peugeot Citroen Automobiles SA, Velizy-Villacoublay (FR)

( * ) Notice: Subject to any disclaimer, the term of this patent is extended or adjusted under 35 U.S.C. 154(b) by 86 days.

(21) Appl. No.: 11/182,852

(22) Filed: Jul. 18, 2005

(65) Prior Publication Data

US 2006/0016178 A1 Jan. 26, 2006

(30) Foreign Application Priority Data

Jul. 20, 2004 (FR) .................................. 04 08049

(51) Int. Cl.
*F01N 3/00* (2006.01)
(52) U.S. Cl. ............................ 60/277; 60/274; 60/285; 60/286; 60/295
(58) Field of Classification Search ................. 60/277, 60/285, 286, 295
See application file for complete search history.

(56) References Cited

U.S. PATENT DOCUMENTS

| | | | |
|---|---|---|---|
| 5,174,111 A * | 12/1992 | Nomura et al. ................ | 60/285 |
| 6,119,449 A | 9/2000 | Koehler | |
| 6,237,330 B1 * | 5/2001 | Takahashi et al. ............. | 60/285 |
| 6,263,666 B1 * | 7/2001 | Kubo et al. .................... | 60/277 |
| 6,574,953 B1 * | 6/2003 | Ingram et al. ................. | 60/277 |
| 6,826,902 B2 * | 12/2004 | Sun et al. ...................... | 60/274 |
| 7,051,520 B2 * | 5/2006 | Nagaoka et al. ............... | 60/297 |
| 7,069,719 B2 * | 7/2006 | Takubo et al. ................. | 60/285 |
| 7,089,730 B2 * | 8/2006 | Wachi et al. ................... | 60/285 |
| 7,121,080 B2 * | 10/2006 | Sun et al. ...................... | 60/277 |
| 2003/0126857 A1 * | 7/2003 | Kitahara ........................ | 60/278 |
| 2003/0163987 A1 * | 9/2003 | Schnaibel et al. ............. | 60/285 |
| 2005/0056002 A1 * | 3/2005 | Nakagawa et al. ............ | 60/277 |
| 2005/0109022 A1 * | 5/2005 | Nagaoka et al. ............... | 60/297 |
| 2006/0010859 A1 * | 1/2006 | Yan et al. ...................... | 60/286 |
| 2006/0064968 A1 * | 3/2006 | Sunohara et al. .............. | 60/285 |
| 2006/0123768 A1 * | 6/2006 | Miura ........................... | 60/277 |

FOREIGN PATENT DOCUMENTS

| | | |
|---|---|---|
| DE | 196 07 151 C1 | 7/1997 |
| EP | 1 416 130 A2 | 5/2004 |
| FR | 2 768 181 | 3/1999 |

* cited by examiner

*Primary Examiner*—Thomas Denion
*Assistant Examiner*—Loren C. Edwards
(74) *Attorney, Agent, or Firm*—Nicolas E. Seckel

(57) ABSTRACT

The invention relates to a device for determining the mass of NOx stored in a NOx trap in an exhaust line of a motor vehicle engine, the device comprising means for acquiring the richness of the exhaust gases, the NOx flowrate on the upstream side of the trap, and the temperature of the trap. This device further comprises means for comparing the richness to a predetermined value, first means for determining, when the exhaust gases are lean, the increase in the mass of NOx stored as a function of the mass of NOx already stored, the temperature of the trap, and the NOx flowrate on the upstream side of the trap, and second means for determining, when the exhaust gases are rich, the reduction of the mass of NOx stored as a function of the temperature of the trap and the richness of the exhaust gases.

8 Claims, 3 Drawing Sheets

DEVICE FOR DETERMINING THE MASS OF NOX STORED IN A NOX TRAP, AND A SYSTEM FOR SUPERVISING THE REGENERATION OF A NOX TRAP INCLUDING SUCH A DEVICE

The present invention relates to a device for determining the mass of NOx stored in a NOx trap in a motor vehicle engine exhaust line and a system for supervising the regeneration of a NOx trap including such a device.

The present invention relates more particularly to a device of the above type including means for acquiring the richness of the exhaust gases, the NOx flowrate on the upstream side of the NOx trap, and the temperature of the NOx trap.

BACKGROUND OF THE INVENTION

Motor vehicle engines, and more particularly diesel engines, emit pollutant particles such as nitrogen oxides (NOx). To minimize the emission of such pollutants, the exhaust line of the engine generally includes a NOx trap to trap and reduce the NOx emitted by the engine.

The NOx trap typically has two operating states, namely a NOx storage state and a NOx reduction state, that are controlled as a function in particular of the richness of the exhaust gases entering the trap and the temperature of the trap.

Since the storage capacity of the trap is limited, it is necessary to regenerate the trap, i.e. to reduce the NOx stored therein, regularly and/or periodically.

To this end, the engine is generally associated with a system for supervising the operation of the NOx trap that controls the operation of the engine as a function of information such as the temperature of the trap, the operating point of the engine or the mass of NOx stored in the NOx trap, for example.

As a function of the above information, the supervisory system generally varies the injection of fuel into the cylinders of the engine to vary the richness and the temperature of the exhaust gases.

Some of the information used by the supervisory system is simple to acquire, for example by means of sensors. However, other information, and more particularly the mass of NOx stored in the NOx trap, is difficult to measure and has to be estimated on the basis of a model of the operation of the NOx trap.

This kind of estimation conventionally necessitates a considerable amount of calculation, with the result that it is difficult to implement on a motor vehicle unless a microcontroller of considerable computation capacity is used.

Using a model of the operation of the NOx trap may yield an inaccurate estimate if the conditions of operation of the NOx trap are not compatible with the characteristics of the model, which is conventionally based on a predefined range of operation of the NOx trap; thus operation of the NOx trap outside this range can lead to an inaccurate estimate of the mass stored in the trap.

OBJECT AND SUMMARY OF THE INVENTION

The object of the present invention is to solve the above problems by proposing a device for determining the mass of NOx stored in a NOx trap that is reliable and fast, both during the phase of storing NOx in the trap and during the phase of regenerating the trap.

To this end, the invention consists in a device for determining the mass of NOx stored in a NOx trap in an exhaust line of a motor vehicle engine, which device comprises means for acquiring the richness of the exhaust gases, the flowrate of NOx on the upstream side of the NOx trap, and the temperature of the NOx trap, and further comprises:

means for comparing the richness of the exhaust gases on the upstream side of the NOx trap to a predetermined value to determine if the exhaust gases on the upstream side of the NOx trap are lean or rich;

first determination means for determining, when the exhaust gases are lean, the increase per unit of time of the mass of NOx stored in the NOx trap as a function of the mass of NOx already stored in the NOx trap, the temperature of the NOx trap, and the flowrate of the NOx on the upstream side of the NOx trap; and second determination means for determining, when the exhaust gases are rich, the reduction per unit of time of the mass of NOx stored in the NOx trap as a function of the temperature of the NOx trap and the richness of the exhaust gases on the upstream side of the NOx trap.

Particular embodiments of the device comprise one or more of the following features:

the determination first means for determining the increase per unit of time of the mass of NOx stored comprise:
mapping means adapted to determine the NOx storage efficiency of the NOx trap by evaluating a predetermined mapping of storage efficiencies for the mass of NOx already stored and the temperature of the NOx trap; and
means for multiplying the acquired NOx flowrate by the determined storage efficiency of the NOx trap to determine the increase per unit of time of the mass of NOx stored in the NOx trap;

it further comprises means for acquiring the air flowrate at the inlet of the engine and means for calculating the ratio between the air flowrate at the inlet of the engine and the storage volume of the NOx trap, and the first means for determining the increase per unit of time of the mass of NOx stored further comprise means for correcting as a function of that ratio the determined increase per unit of time;

it further comprises means for acquiring the concentration of NOx in the exhaust gases on the upstream side of the NOx trap, and the first means for determining the increase per unit of time of the mass of NOx stored further comprise means for correcting the determined increase per unit of time as a function of that concentration;

it further comprises means for acquiring the degree of wear of the NOx trap and the first means for determining the increase per unit of time of the mass of NOx stored further comprise means for correcting the determined increase per unit of time as a function of that degree of wear;

the second determination means for determining the reduction per unit of time of the mass of NOx stored comprise mapping means adapted to determine the reduction per unit of time of the mass of NOx by evaluating a predetermined mapping of reduction per unit of time for the acquired richness of the exhaust gases on the upstream side of the NOx trap and the acquired temperature of the NOx trap;

it further comprises means for acquiring the air flowrate at the inlet of the engine and means for calculating the ratio between the air flowrate at the inlet of the engine and the storage volume of the NOx trap, and the second means for determining the reduction per unit of time of the mass of NOx stored further comprise means for correcting the determined reduction per unit of time as a function of that ratio.

Another aspect of the invention consists in a supervisory system that comprises the above device for determining the mass of NOx stored in the NOx trap.

That system further comprises means for activating regeneration of the NOx trap when the mass of NOx stored in the NOx trap is greater than a first predetermined value and means for deactivating regeneration of the NOx trap when the mass of NOx stored in the NOx trap is less than a second predetermined value.

BRIEF DESCRIPTION OF THE DRAWINGS

The present invention will be better understood after reading the following description, which is given by way of example only and with reference to the appended drawings, in which identical reference numbers relate to identical or analogous components and.

MORE DETAILED DESCRIPTION

Figure 1:
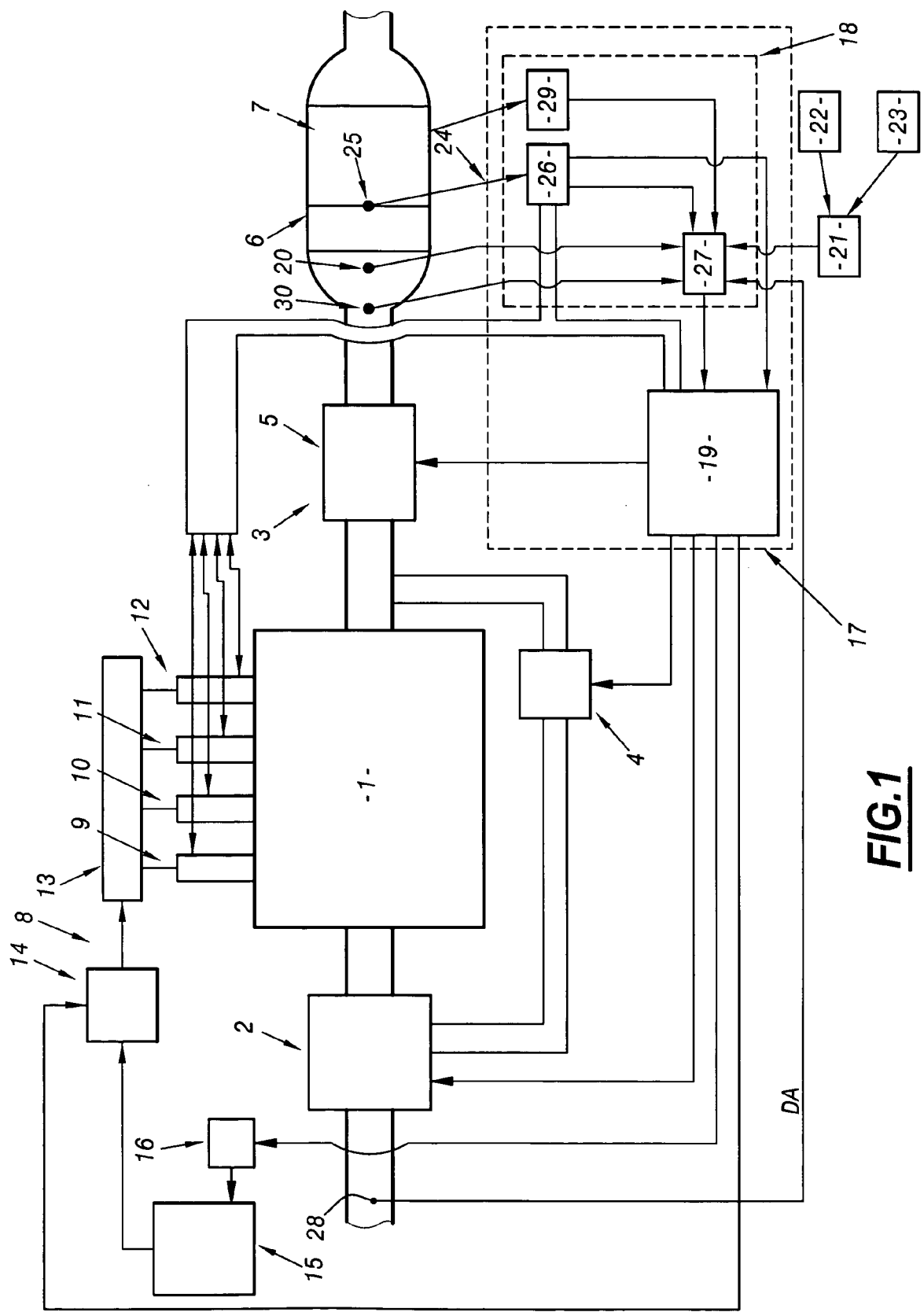
FIG. 1 is a diagram of a supervisory system associated with a motor vehicle diesel engine and including a device of the invention for determining the mass of NOx stored in a NOx trap.

FIG. 1 shows diagrammatically a motor vehicle engine 1, for example a diesel engine.

The engine 1 is associated with means 2 for admitting gas to the inlet thereof and an exhaust line 3 for the exhaust gases burned in the engine 1.

Exhaust gas recycling (EGR) means 4 are provided and deliver a portion of the exhaust gases at the outlet of the engine to the admission means 2, which also receive air at their inlet and deliver to the engine 1 a mixture of air and exhaust gases; all this is known in the art.

The exhaust line 3 may equally be associated with a turbocompressor 5, and more particularly with the turbine portion thereof.

To limit the emission into the atmosphere of pollutants, in particular NOx and/or sulfur particles, the exhaust line 3 includes an oxidation catalytic converter 6 and a NOx trap 7 on the downstream side of the catalytic converter 6, for example.

The catalytic converter 6 generates heat at the inlet of the NOx trap 7 to assist its regeneration, for example by burning hydrocarbons delivered by the engine 1; this is known in the art.

The engine 1 is also associated with means 8 for feeding fuel to the cylinders thereof by means of injectors 9, 10, 11 and 12, for example electronically controlled injectors, there being four cylinders in this example.

The fuel feed means 8 may also include a common fuel feed manifold 13 that is connected to the injectors 9, 10, 11, 12 and to a high-pressure pump 14 for feeding them with fuel from a fuel tank 15. The fuel tank 15 may be associated with means for adding to the fuel an additive stored in an auxiliary tank 16 and intended to be deposited in the NOx trap with the particles with which it is mixed to reduce the combustion temperature of the particles trapped in the trap and thereby assist regeneration of the trap.

The engine 1 and the units that have just been described are associated with a supervisory system 17 for supervising the operation of the NOx trap 7. The supervisory system 17 monitors the operating state of the NOx trap, and in particular its saturation with NOx, and controls various phases of the operation of the engine accordingly.

To this end, the supervisory system 17 controls the operation of the units associated with the engine 1 as a function of acquired information, for example the temperature of the NOx trap 7, the temperature of the catalytic converter 6, the quantity of fuel admitted into the cylinders, etc. For example, the supervisory system 17 controls the characteristics of the injection of fuel into the cylinders after their top dead centre position, also known as post-injection, to feed the catalytic converter 6 with unburned hydrocarbons and thereby generate heat at the inlet of the NOx trap 7, or controls the richness of the exhaust gases, thereby conditioning the phase of regeneration of the NOx trap 7.

The supervisory system 17 advantageously includes a device 18 for determining the mass of NOx stored in the NOx trap 7 and supervisory means 19 that compare the stored mass of NOx determined by the device 18 to predetermined values to control the phases of operation of the NOx trap 7.

If the stored mass of NOx determined by the device 18 is greater than a first predetermined value, representative of a state close to saturation of the NOx trap, for example, the supervisory means 19 activate regeneration of the NOx trap, for example by controlling the injectors 9, 10, 11, 12 to post-inject relatively large quantities of fuel so that the catalytic converter 6 generates heat at the inlet of the NOx trap 7 and/or so that the richness of the exhaust gases is increased; this is known in the art.

If the stored mass of NOx determined by the device 18 is less than a second predetermined value, for example close to zero, the supervisory means 19 deactivate regeneration of the NOx trap.

The device 18 for determining the mass of NOx stored in the NOx trap 7 includes means 27 for acquiring the richness Ri of the exhaust gases on the upstream side of the trap, such as a proportional higher $\lambda$ probe in the exhaust line 3 on the upstream side of the NOx trap 7.

The device 18 also includes means 21 for acquiring the flowrate DNOx of NOx on the upstream side of the NOx trap that advantageously determine the flowrate DNOx of NOx on the upstream side of the NOx trap 7 as a function of a predetermined mapping of NOx flowrates evaluated for values of the engine speed and the engine torque delivered to the means 21 by an engine speed sensor 22 and an engine torque sensor 23, respectively.

The device 18 for determining the mass of NOx stored in the NOx trap 7 also includes means 24 for acquiring the temperature T of the NOx trap 7. For example, the acquisition means 24 include a temperature sensor 25 in the exhaust line 3 on the upstream side of the NOx trap 7 and means 26 for determining the temperature T of the NOx trap 7 as a function of the temperature acquired on the upstream side thereof and operating parameters of the injectors 9, 10, 11, 12 received at their input.

Of course, the temperature T of the NOx trap may equally be acquired by means of an appropriate temperature sensor in the trap itself.

The device 18 for determining the mass of NOx stored in the NOx trap 7 also includes means 28 for acquiring the air flowrate DA at the inlet of the engine, for example a flowmeter at the inlet of the admission means 2, means 29 for determining the degree of wear EU of the NOx trap, for example as a function of the distance the vehicle has traveled, and means 30 for acquiring the NOx concentration [NOx] in the exhaust gases on the upstream side of the trap, including a NOx sensor on the upstream side of the NOx trap 7 or means for estimating this concentration using a model for estimating the concentration at the outlet of the engine, for example.

Finally, the device 18 for determining the mass of NOx stored in the NOx trap 7 includes means 27 for determining the mass of NOx stored in the NOx trap that receive at their input the acquired richness Ri of the exhaust gases, the acquired temperature T of the NOx trap 7, and the acquired NOx flowrate DNOx. The determination means 27 determine and deliver to the supervisory means 19 the mass of NOx stored in the NOx trap 7 as a function of this input, as explained in more detail below.

The acquired air flowrate DA, the acquired degree of wear EU of the NOx trap 7, and the acquired NOx concentration [NOx] are also delivered to the determination means 27 in order to increase the accuracy of the determination of the stored mass of NOx as a function of the temperature T, the flowrate DNOx and the richness Ri, as explained in more detail below.

Figure 2:
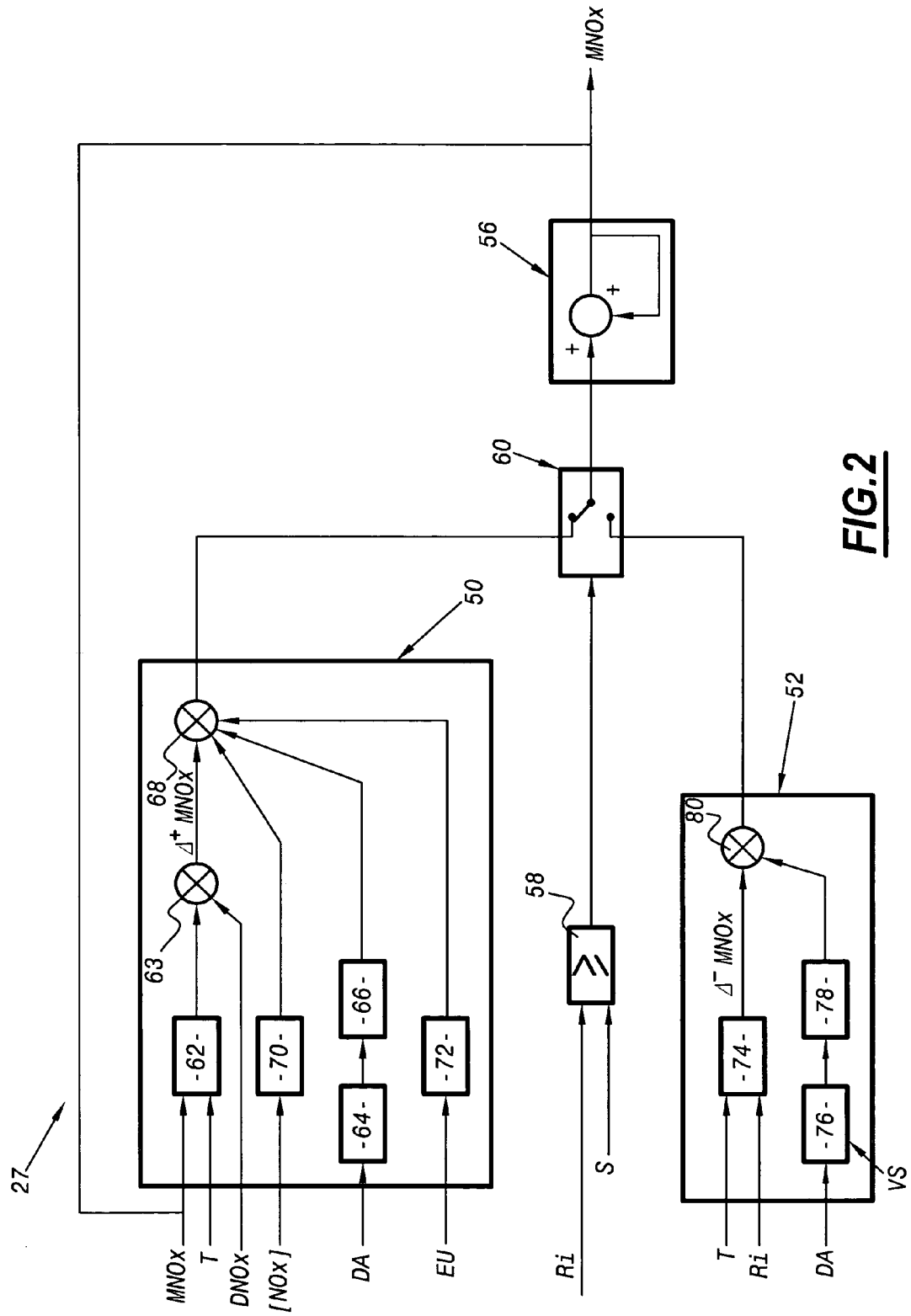
FIG. 2 is a more detailed diagram of the means for determining the stored mass of NOx included in the FIG. 1 device.

The arrangement and operation of the means 27 for determining the mass of NOx stored in the NOx trap 7 are described in more detail next with reference to FIG. 2.

The determination means 27 include first determination means 50 for determining the increase $\Delta^+$MNOx per unit of time of the mass of NOx stored in the NOx trap when the exhaust gases are lean.

The determination means 27 also include second determination means 52 for determining the reduction $\Delta^-$MNOx per unit of time of the mass of NOx stored in the NOx trap when the exhaust gases are rich.

For example, the first determination means 50 deliver continuously a value that is a function of the mass MNOx of the NOx already stored in the NOx trap, the acquired temperature T of the NOx trap, and the acquired NOx flowrate DNOx.

The mass MNOx of NOx already stored in the trap is stored in the storage means 56 and delivered to the input of the first determination means 50.

The value delivered by the first determination means 50 is thus equal to the increase $\Delta^+$MNOx per unit of time of the mass of NOx stored when the exhaust gases are lean.

Similarly, the second determination means 52 deliver continuously a value that is a function of the acquired temperature T of the NOx trap and the richness Ri of the exhaust gases on the upstream side thereof. The value delivered by the second means 52 is thus equal to the reduction $\Delta^-$MNOx per unit of time of the mass of NOx stored in the NOx trap when the exhaust gases are rich.

The determination means 27 also include comparison means 58 that compare the acquired richness Ri of the exhaust gases to a predetermined value S to determine if the exhaust gases on the upstream side of the NOx trap are rich or lean. If the acquired richness of the exhaust gases is greater than or equal to the value S, the exhaust gases are deemed to be rich; if the acquired richness Ri is below the value S, the exhaust gases are deemed to be lean.

The result of the comparison effected by the comparison means 58 is then delivered as a control signal to a driven switch 60 whose inputs are connected to the outputs of the first determination means 50 and the second determination means 52.

When the comparison means 58 determine that the exhaust gases are rich, the switch selects the output of the first determination means 50; in the contrary situation, that is to say if the gases are deemed to be lean, it selects the output of the second determination means 52.

The output of the switch 60 is then delivered to the means 56 for storing the mass of NOx stored in the NOx trap to update the mass MNOx of NOx already stored in the NOx trap.

The means 50 for determining the increase $\Delta^+$MNOx include in particular mapping means 62 for determining the efficiency of storage of NOx by the NOx trap by evaluating a predetermined mapping of storage efficiencies for the mass MNOx stored in the storage means 56 and the acquired temperature T of the NOx trap.

This predetermined mapping of storage efficiencies is determined beforehand and coded in the form of a look-up table stored in the mapping means 62, for example.

The storage efficiency $\eta_{NOx}$ is defined as the ratio of the mass of NOx stored by the trap per unit of time and the mass of NOx entering the trap per unit of time, i.e. the flowrate DNOx of NOx on the upstream side of the NOx trap. This efficiency can therefore be determined from the following equation, in which $DNOx_{in}$ is the mass of NOx entering the trap per unit of time and $DNOx_{out}$ is the mass of NOx leaving the trap per unit of time, these two masses per unit of time being expressed in grams per second, for example:

$$\eta_{NOx}(\%) = \frac{DNOx_{in} - DNOx_{out}}{DNOx_{in}}$$

Thus, knowing the storage efficiency $\eta_{NOx}$ of the NOx trap, it is possible to determine the increase $\Delta^+$MNOx per unit of time of the mass stored in the NOx trap by multiplying the acquired NOx flowrate DNOx by the efficiency.

Multiplication means 63 therefore multiply the output of the mapping means 62 by the acquired flowrate DNOx.

Research has shown that the storage efficiency $\eta_{NOx}$ also depends on the ratio VVH between the air flowrate DA at the inlet of the engine and the storage volume of the NOx trap, the NOx concentration [NOx] in the exhaust gases on the upstream side of the NOx trap, and the degree of wear EU of the NOx trap.

To take account of these dependencies, and thus to determine the mass of NOx stored in the NOx trap more robustly and reliably, the first determination means 50 include means 64 for calculating the ratio VVH between the acquired flowrate DA at the engine inlet and the storage volume of the NOx trap. Means 64 delivers the calculated ratio VVH to means 66 for correcting the determined increase $\Delta^+$MNOx per unit of time.

For example, the correction means 66 include mapping means adapted to determine a correction parameter by evaluating a predetermined mapping for the calculated ratio VVH. The correction parameter is then delivered to multiplication means 68 which also receive at their input the increase $\Delta^+$MNOx that has been determined and deliver at their output the result of multiplying together the values received at their inputs.

The first determination means 50 also include means 70 for correcting the determined increase $\Delta^+$MNOx per unit of time as a function of the acquired NOx concentration [NOx]. For example, the correction means 70 include mapping means that determine a correction parameter by evaluating a predetermined mapping for the acquired NOx concentration [NOx] and deliver that correction parameter to the multiplication means 68 for correcting the determined increase Δ⁺MNOx.

Finally, the first determination means 50 also include means 72 for correcting the determined increase Δ⁺MNOx as a function of the determined degree of wear EU of the NOx trap. For example, the correction means 72 include mapping means that determine a correction parameter by evaluating a predetermined mapping for the determined degree of wear EU of the NOx trap and deliver that correction parameter to the multiplication means 68 for correcting the determined increase Δ⁻MNOx.

To determine the reduction Δ⁺MNOx per unit of time of the mass of NOx stored in the NOx trap, the second determination means 52 include mapping means 74 that determine the reduction Δ⁻MNOx by evaluating, for the acquired richness Ri of the exhaust gases and the acquired temperature T of the NOx trap, a predetermined mapping of reduction per unit of time stored in the means 74. This mapping, determined beforehand, is coded in the form of a look-up table, for example.

The research referred to above also showed that the reduction Δ⁻MNOx per unit of time of the mass of NOx stored in the NOx trap also depends on the ratio VVH between the air flowrate DA at the inlet of the engine and the storage volume of the NOx trap.

Accordingly, the second determination means 52 further include means 76 for calculating this ratio VVH as a function of the acquired air flowrate DA at the inlet of the engine and the storage volume of the NOx trap. The calculated ratio VVH is delivered to correction means 78 which include, for example, mapping means that determine a correction parameter by evaluating a predetermined mapping for the calculated ratio VVH and deliver that correction parameter to means 80 for multiplying it by the determined reduction Δ⁻MNOx in order to obtain a corrected reduction of the mass of NOx stored in the trap.

Figure 3:
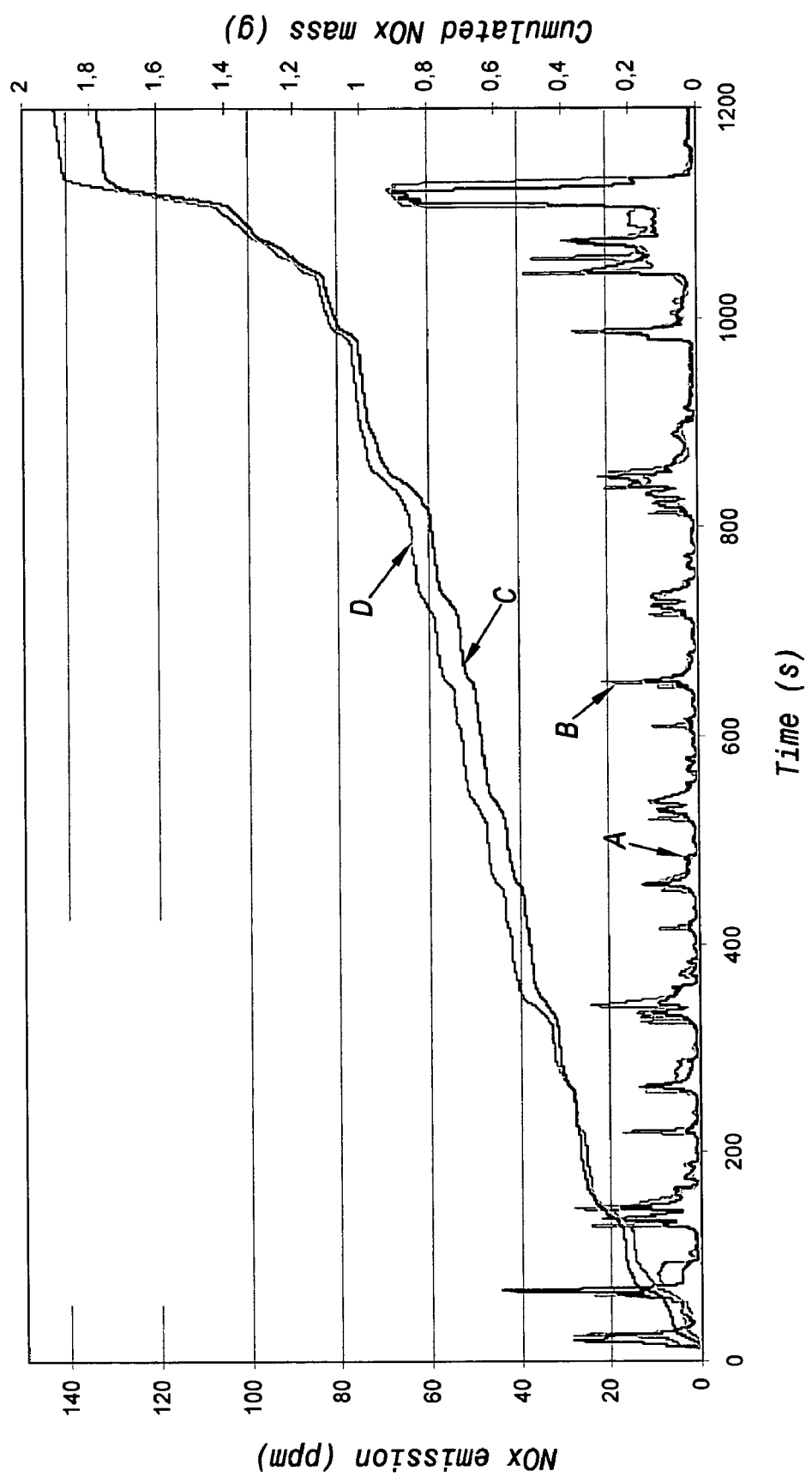
FIG. 3 is a graph showing the accuracy of the determination produced by the device of the invention for determining the mass of NOx stored in the NOx trap.

FIG. 3 is a graph showing the accuracy of determination by the device of the invention of the mass of NOx stored in a NOx trap of a test engine.

The graph in FIG. 3 shows the emission of NOx at the outlet of the trap as measured (curve A) and as determined by the device of the invention (curve B) and the mass of NOx stored in the trap as measured (curve C) and as determined by the device of the invention (curve D).

The relative difference between the measured mass of NOx stored in the trap and the mass of NOx stored in the trap as determined by the device of the invention is approximately 6.5%. It is therefore possible to determine the mass of NOx stored in the trap reliably and robustly using a limited number of calculations.

Of course, it is to be understood that the definitions of the terms "increase per unit of time" and "reduction per unit of time" depend on the implementation of the device for determining the mass of NOx stored in the NOx trap. For example, the unit of time may be equal to one sampling period of the information at the input of the device for determining the stored mass.

Alternatively, the unit of time may tend toward zero, in which case the increase and the reduction are instantaneous values and the device then comprises integration means for determining the mass of NOx stored in the NOx trap, for example analog integration means.

Other embodiments are feasible, of course.

What is claimed is:

1. A device for determining the mass of NOx stored in a NOx trap in an exhaust line of a motor vehicle engine, which device comprises means for acquiring the richness of the exhaust gases, the flowrate of NOx on the upstream side of the NOx trap, and the temperature of the NOx trap, and further comprises:
    means for comparing the richness of the exhaust gases on the upstream side of the NOx trap to a predetermined value to determine if the exhaust gases on the upstream side of the NOx trap are lean or rich;
    first determination means for determining, when the exhaust gases are lean, the increase per unit of time of the mass of NOx stored in the NOx trap as a function of the mass of NOx already stored in the NOx trap, the temperature of the NOx trap, and the flowrate of the NOx on the upstream side of the NOx trap; and
    second determination means for determining, when the exhaust gases are rich, the reduction per unit of time of the mass of NOx stored in the NOx trap as a function of the temperature of the NOx trap and the richness of the exhaust gases on the upstream side of the NOx trap.

2. A device according to claim 1, wherein the first means for determining the increase per unit of time of the mass of NOx stored comprise:
    mapping means for determining the NOx storage efficiency of the NOx trap by evaluating a predetermined mapping of storage efficiencies for the mass of NOx already stored and the temperature of the NOx trap; and
    means for multiplying the acquired NOx flowrate by the determined storage efficiency of the NOx trap to determine the increase per unit of time of the mass of NOx stored in the NOx trap.

3. A device according to claim 1, further comprising means for acquiring the air flowrate at the inlet of the engine and means for calculating the ratio between the air flowrate at the inlet of the engine and the storage volume of the NOx trap, and wherein the first means for determining the increase per unit of time of the mass of NOx stored further comprise means for correcting as a function of that ratio the determined increase per unit of time.

4. A device according to claim 1, further comprising means for acquiring the concentration of NOx in the exhaust gases on the upstream side of the NOx trap, and wherein the first means for determining the increase per unit of time of the mass of NOx stored further comprise means for correcting the determined increase per unit of time as a function of that concentration.

5. A device according to claim 1, further comprising means for acquiring the degree of wear of the NOx trap and wherein the first means for determining the increase per unit of time of the mass of NOx stored further comprise means for correcting the determined increase per unit of time as a function of that degree of wear.

6. A device according to claim 1, wherein the second means for determining the reduction per unit of time of the mass of NOx stored comprise mapping means adapted to determine the reduction per unit of time of the mass of NOx by evaluating a predetermined mapping of reduction per unit of time for the acquired richness of the exhaust gases on the upstream side of the NOx trap and the acquired temperature of the NOx trap.

7. A device according to claim 1, further comprising means for acquiring the air flowrate at the inlet of the engine and means for calculating the ratio between the air flowrate at the inlet of the engine and the storage volume of the NOx trap, and wherein the second means for determining the reduction per unit of time of the mass of NOx stored further comprise means for correcting the determined reduction per unit of time as a function of that ratio.

8. A system for supervising the regeneration of a NOx trap in an exhaust line of a motor vehicle engine, said system comprising a device for determining the mass of NOx stored in the NOx trap according to claim 1 and means for activating regeneration of the NOx trap when the mass of NOx stored in the NOx trap is greater than a first predetermined value and means for deactivating regeneration of the NOx trap when the mass of NOx stored in the NOx trap is less than a second predetermined value.

* * * * *